(12) United States Patent
Morgan et al.

(10) Patent No.: US 6,968,459 B1
(45) Date of Patent: Nov. 22, 2005

(54) COMPUTING ENVIRONMENT HAVING SECURE STORAGE DEVICE

(75) Inventors: Jeffrey A. Morgan, Afton, MN (US); C. Thomas Jennings, Woodbury, MN (US); Larold L. Olson, Lindstrom, MN (US); Luiz S. Pires, St. Paul, MN (US); Daniel P. Stubbs, Marine on St. Croix, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/464,347

(22) Filed: Dec. 15, 1999

(51) Int. Cl.[7] .................. G06F 12/14; G06F 12/16; H04L 9/00
(52) U.S. Cl. .................. 713/189; 713/164; 713/165
(58) Field of Search .................. 713/164, 165

(56) References Cited

U.S. PATENT DOCUMENTS

| | | | |
|---|---|---|---|
| 5,412,718 A | | 5/1995 | Narasimhalu et al. |
| 5,475,839 A | * | 12/1995 | Watson et al. .................. 713/2 |
| 5,887,131 A | * | 3/1999 | Angelo .................. 713/202 |
| 6,067,622 A | * | 5/2000 | Moore .................. 713/200 |
| 2002/0124176 A1 | * | 9/2002 | Epstein .................. 713/186 |

FOREIGN PATENT DOCUMENTS

EP     0 706 174 A1     4/1996

* cited by examiner

Primary Examiner—Matthew Smithers
(74) Attorney, Agent, or Firm—Eric D. Levinson (57) ABSTRACT

A secure computing environment in which a computer automatically operates in a full-access data storage mode when it detects the presence of a secure removable storage device. In full-access mode all data written to removable storage device is encrypted with a cryptographic key and the user is given access to sensitive if authorized. Otherwise, the computer operates in a restricted-access mode in which the user is unable to write to the removable storage device and is unable to access sensitive data. The invention detects security information on the data storage device and generates a cryptographic key from the security information. The security information can be a function of the unique format characteristics of the underlying storage medium, a unique identifier retrieved from an electronic circuit embedded within the removable storage device or a serial number etched on the storage device during manufacturing. In addition, drive-specific information and even user-specific information can also be used to generate the cryptographic key, thereby creating a highly secure computing environment. When the computer operates in a full-access mode, all data written to the storage device is encrypted and the user is able access to sensitive data within the organization. When security information is not present on the removable storage device the computer automatically operates in a restricted-access mode in which the user does not have access to sensitive data and data cannot be written to the removable storage device.

50 Claims, 5 Drawing Sheets

COMPUTING ENVIRONMENT HAVING SECURE STORAGE DEVICE

TECHNICAL FIELD

This invention relates generally to the field of data storage devices, and more particularly to a computer that automatically operates in a full-access data storage mode when the computer senses the use of a secure storage device.

BACKGROUND

There are many challenges to creating a highly secure computing environment including preventing eavesdroppers from accessing private communications, preventing vandals from tampering with information while in transit from sender to receiver, authenticating users logging into a network, verifying a network server is indeed the server it professes to be and safeguarding confidential documents from unauthorized individuals.

One of the greatest challenges, however, is preventing the authorized user from using sensitive data in an unauthorized manner. For example, with conventional security measures it is very difficult to prevent an authorized user from appropriating sensitive data by simply copying the sensitive data to a removable storage device such as floppy diskette. For these reasons, and for other reasons stated below which will become apparent to those skilled in the art upon reading and understanding the present specification, there is a need in the art for an improved mechanism for preventing the appropriation of sensitive data.

SUMMARY

According to the invention, the above-mentioned problems are addressed by a secure computing environment in which a computer automatically operates in a secure "full-access" data storage mode when the computer detects the presence of a secure removable storage device. If the computer senses a non-secure removable storage device then the computer automatically operates in a "restricted-access" mode.

In the secure full-access mode, storage management software uses a cryptographic key to encrypt and decrypt the data stream between the computer and the removable storage device. Depending upon the selected security level, the cryptographic key is generated by a combination of the following: (1) device-specific information derived of the removable storage device, (2) manufacturing information that has been etched onto the storage device, (3) drive-specific information, such as drive calibration parameters, retrieved from the storage drive, and (4) user-specific information such as a password or biometric information such as input received from a fingerprint scan or retina scan.

In addition, the present invention facilitates the use of a secure storage device as a secure "access card" by which the user gains access to sensitive data of the organization. More specifically, the user is permitted to access sensitive data stored on other local storage devices, or on remote computers within the organization, only when the computer is operating in full-access data storage mode.

In the restricted-access mode, however, the computer operates the storage drive as a read-only drive such that the user can read data from the removable storage device but cannot write data to the drive. Alternatively, the user can access only non-sensitive data within the organization and may be allowed to write the non-sensitive data to the removable storage device in an unencrypted format.

DETAILED DESCRIPTION

The following sections describe in detail how the present invention addresses the problems outlined above. In the following detailed description, references are made to the accompanying drawings that illustrate specific embodiments in which the invention may be practiced.

System Level Overview

Figure 1:
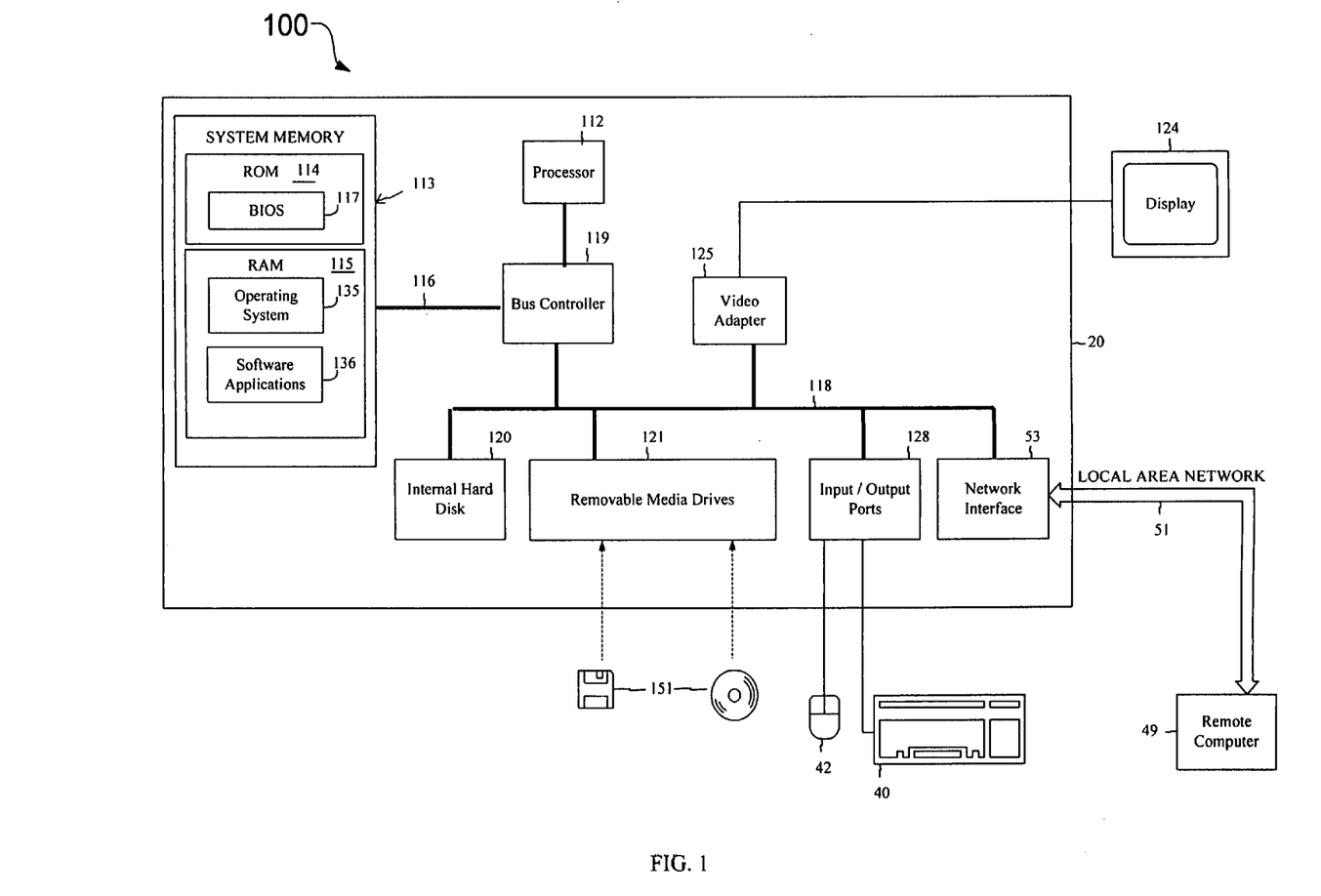
FIG. 1 is a block diagram of a computer that automatically operates in a secure data storage mode when a secure storage device is detected.

FIG. 1 illustrates a block diagram of a computer 100 that automatically operates in a secure data storage mode when the computer 100 senses that storage device 151 is a secure storage device. As shown in FIG. 1, the computer 100 includes a processor 112 that in one embodiment belongs to the PENTIUM® family of microprocessors manufactured by the Intel Corporation of Santa Clara, Calif. However, it should be understood that the invention can be implemented on computers based upon other microprocessors, such as the MIPS® family of microprocessors from the Silicon Graphics Corporation, the POWERPC® family of microprocessors from both the Motorola Corporation and the IBM Corporation, the PRECISION ARCHITECTURE® family of microprocessors from the Hewlett-Packard Company, the SPARC® family of microprocessors from the Sun Microsystems Corporation, or the ALPHA® family of microprocessors from the Compaq Computer Corporation. Computer 100 represents any server, personal computer, laptop or even a battery-powered, pocket-sized, mobile computer known as a hand-held PC.

Computer 100 includes system memory 113 (including read only memory (ROM) 114 and random access memory (RAM) 115), which is connected to the processor 112 by a system data/address bus 116. ROM 114 represents any device that is primarily read-only including electrically erasable programmable read-only memory (EEPROM), flash memory, etc. RAM 115 represents any random access memory such as Synchronous Dynamic Random Access Memory.

Within the computer 100, input/output bus 118 is connected to the data/address bus 116 via bus controller 119. In one embodiment, input/output bus 118 is implemented as a standard Peripheral Component Interconnect (PCI) bus. The bus controller 119 examines all signals from the processor 112 to route the signals to the appropriate bus. Signals between the processor 112 and the system memory 113 are merely passed through the bus controller 119. However, signals from the processor 112 intended for devices other than system memory 113 are routed onto the input/output bus 118. Video display 124 or other kind of display is connected to the input/output bus 118 via a video adapter 125.

Various storage drives are connected to the input/output bus 118 including hard disk drive 120 and one or more removable media drives 121 that are used to access one or more removable storage devices 151. Each storage device 151 represents a removable device having a storage medium for holding digital information such as a floppy diskette, a magneto-optical storage device, an optical disk, a SuperDisk™ diskette, a Zip™ disk, a Jazz™ disk, a tape cartridge, etc. Each removable media drive 121 represents a device suitable for servicing access requests for storage device 151 such as a floppy drive, a magneto-optical drive, a CD-ROM drive, a SuperDisk™ drive, a removable-cartridge drive such as a Zip™ drive, or even a tape drive.

A user enters commands and information into the computer 100 by using a keyboard 40 and/or pointing device, such as a mouse 42, which are connected to bus 118 via input/output ports 128. Other types of pointing devices (not shown in FIG. 1) include track pads, track balls, joy sticks, data gloves, head trackers, and other devices suitable for positioning a cursor on the video display 124.

Software applications 136 and data are typically stored via one of the storage devices, which may include the hard disk 120 or storage devices 151, and are copied to RAM 115 for execution. In one embodiment, however, software applications 136 are stored in ROM 114 and are copied to RAM 115 for execution or are executed directly from ROM 114.

In general, the operating system 135 executes software applications 136 and carries out instructions issued by the user. For example, when the user wants to load a software application 136, the operating system 135 interprets the instruction and causes the processor 112 to load software application 136 into RAM 115 from either the hard disk 120 or a storage device 151. Once software application 136 is loaded into the RAM 115, it can be used by the processor 112. In case of large software applications 136, processor 112 loads various portions of program modules into RAM 115 as needed.

The Basic Input/Output System (BIOS) 117 for the computer 100 is stored in ROM 114 and is loaded into RAM 115 upon booting. Those skilled in the art will recognize that the BIOS 117 is a set of basic executable routines that have conventionally helped to transfer information between the computing resources within the computer 100. Operating system 135 or other software applications 136 use these low-level service routines.

In one embodiment, computer 100 includes a registry (not shown) which is a system database that holds configuration information for computer 100. For example, Windows® 95 and Windows® NT by Microsoft maintain the registry in two hidden files, called USER.DAT and SYSTEM.DAT, located on a permanent storage device such as an internal disk.

According to the invention, computer 100 automatically operates in a full-access data storage mode only when the computer 100 detects a secure removable storage device 151 present within any one of the removable media drives 121. In the secure full-access mode, storage management software uses a cryptographic key to encrypt and decrypt the data stream between the computer and the removable storage device. Depending upon the selected security level, the cryptographic key is generated by combining one or more of the following: (1) device-specific security information derived from the unique format information of the removable storage device, (2) manufacturing information that has been etched onto the storage device, (3) drive-specific information, such as drive calibration parameters, retrieved from the storage drive, and (4) user-specific information such as a password or biometric information.

In order to automatically detect whether a storage device 151 is a secure device, computer 100 determines whether device-specific security information was written to storage device 151. In one embodiment, the device-specific security information is a function of the low-level format information and, therefore, uniquely identifies the underlying media of storage device 151. For example, in one embodiment the device-specific security information is a hash of the addresses of the bad sectors for storage device 151. Because it is a function of the physical characteristics of the actual storage medium within storage device 151, the format information is inherently unique to each storage device 151. In other words, the addresses of the bad sectors change from device to device.

The device-specific security information can be combined with other security information in order to increase the level of security of computer 100. For example, in another embodiment, the device specific security information can be combined with information that was etched into the storage device 151 via a laser during manufacturing. In yet another embodiment, drive-specific information, such as internal calibration parameters, for one or more of the removable media drives 121 can be used to generate the key. As described below, computer 100 automatically operates in a full-access data storage mode upon detecting the device-specific security information on storage device 151. If the device-specific security information is not detected, then computer 100 operates in a restricted access data storage mode.

Methods of an Exemplary Embodiment of the Invention

In the previous section, a system level overview of various embodiments of the invention was described. In this section, the particular methods performed by the exemplary embodiments are described by reference to a flowchart. The methods to be performed by the embodiments constitute computer programs made up of computer-executable instructions.

Figure 2:
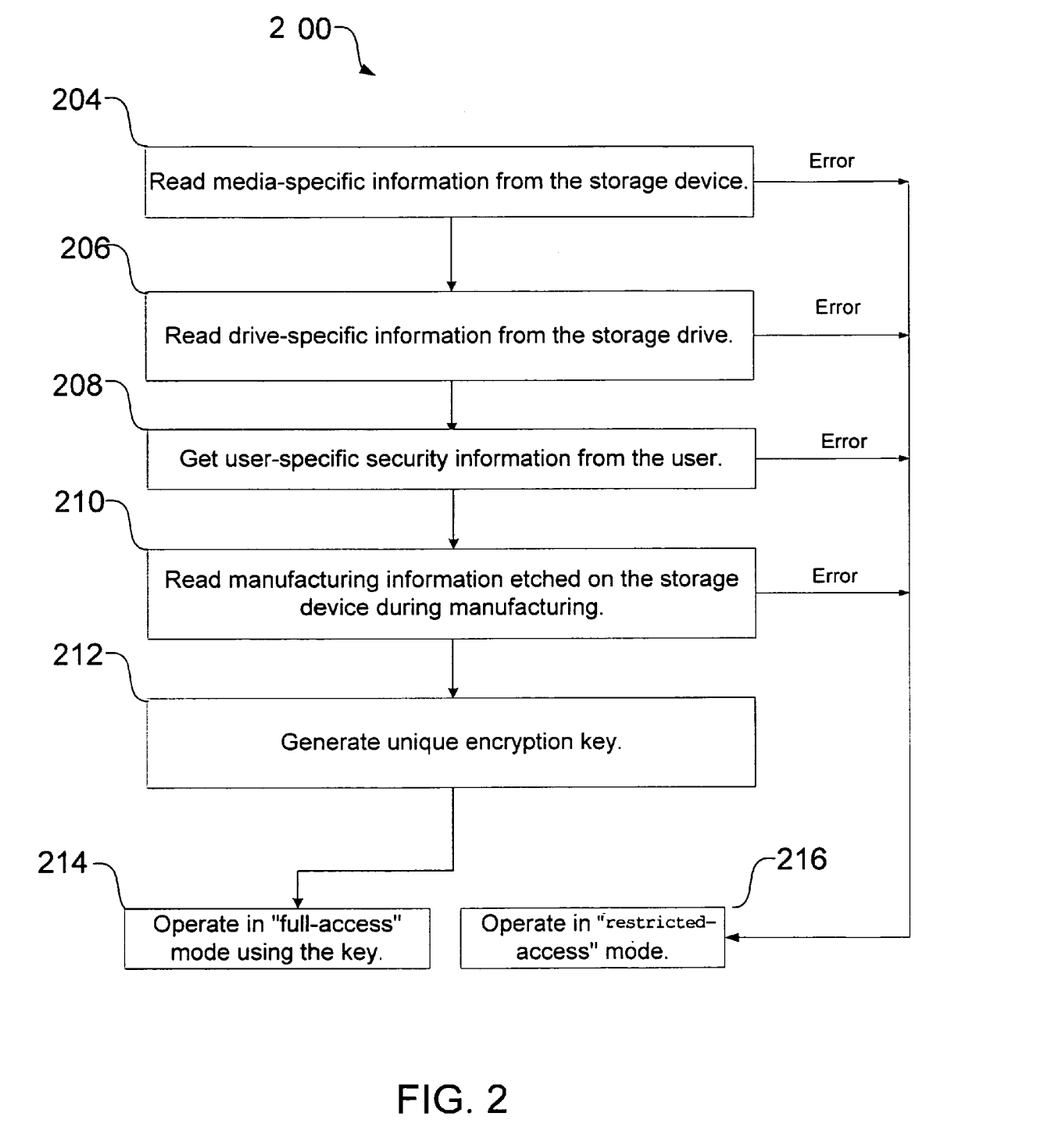
FIG. 2 is a flow chart illustrating one embodiment of a method by which a software application executing on the computer of FIG. 1 determines whether to configure the computer to operate in full-access mode on restricted-access mode.

FIG. 2 is a flow chart illustrating method 200 illustrating in more detail how computer 100 detects the device-specific security information on storage device 151 and automatically operates in a full-access data storage mode. Method 200 is described in reference to one or more software applications 136 executing on computer 100, referred to hereafter as the storage manager. The storage manager may comprise one or more software applications, device drivers, dynamically-linked library (DLL) or any suitable combination thereof that manages the data storage devices of computer 100, including removable media drive 121 and internal hard disk 120. In one embodiment, the storage manager performs method 200 anytime a status change is detected for storage device 151, such as when storage device 151 is inserted into removable media drive 121. In another embodiment, the storage manager performs method 200 at the request of a user.

Method 200 is described in reference to a high secure environment in which a cryptographic key is generated by combining all of the following: (1) device-specific information of the removable storage device, (2) manufacturing information that has been etched onto the storage device, (3)

drive-specific information, such as drive calibration parameters, retrieved from the storage drive, and (4) user-specific information such as a password or biometric information. In other embodiments, however, various levels of security can be achieved by generating the key from a subset of the above inputs.

In block 204, the storage manager detects whether storage device 151 is a "secure" removable device by attempting to read any device-specific security information from storage device 151. In one embodiment, the device-specific security information is a function of the low-level format information and, therefore, uniquely identifies the underlying media of storage device 151. The storage manager proceeds to block 206 when it successfully detects and reads device-specific security information. If the device-specific security information is not successfully read, then the storage manager proceeds to block 216 and operates computer 100 in a restricted-access data storage mode as described in detail below.

In block 206, the storage manager retrieves drive-specific security information that is specific to removable media drive 121 such as a serial number or calibration parameters, from a non-volatile memory within removable media drive 121. Typical calibration parameters that are suitable for generating the cryptographic key includes configuration parameters for read and write circuitry internal to removable media drive 121, tracking parameters, read channel boost, frequency cutoff values, read threshold values, alignment values, optical alignment correction parameters and analog to digital conversion calibrations. Because these calibration parameters are unique to each drive, they are well suited for generating a cryptographic key that is drive-specific. In one embodiment, the drive-specific information is a hash of the above parameters and is stored in non-volatile memory within removable media drive 121. If the storage manager is unable to retrieve the drive-specific information, the storage manager proceeds to block 216 and operates computer 100 in a restricted-access data storage mode.

In block 208, the storage manager retrieves user-specific security information from the computer user by, for example, prompting the user for a password, or performing a retina or fingerprint scan. If for some reason the storage manager is unable to retrieve the user-specific information from the current user, then the storage manager proceeds to block 216 and operates computer 100 in a restricted-access data storage mode.

In block 210, the storage manager retrieves manufacturing information that was physically etched on storage device 151 during the manufacturing process. For example, in one embodiment a laser etches a unique serial number, run number or a date stamp on the storage device during manufacturing. In another embodiment, however, storage device 151 contains a computer chip for electronically storing a unique identifier. If the storage manager is unable to read the manufacturing-specific security information, then the storage manager proceeds to block 216 and operates computer 100 in a restricted-access data storage mode.

In block 212, the storage manager generates a cryptographic key by combining the information, or a portion thereof, that was retrieved in blocks 206 through 210. For example, by using the device-specific information retrieved in block 206 and the manufacturing information retrieved in block 210, a highly-secure device-specific cryptographic key can be generated such that the data stored on storage device 151 is unreadable if copied to other removable media. Similarly, by incorporating the drive-specific information and the user-specific information in the generation of the key, a highly secure computing system is achieved in which data can only be stored on the original storage device from the original storage drive by the authorized user.

In one embodiment, in order to generate the cryptographic key, the storage manager combines, such as by concatenating, all or various portions of the information that was retrieved in blocks 206 through 210 and submits the result to a conventional cryptographic hashing algorithm. For example, the drive-specific information, the manufacturing information, the user information and the storage device-specific information can be combined and used as input to the cryptographic algorithm. All data written to or read from storage device 151 is encrypted and decrypted, respectively, via the cryptographic key, thereby providing a very high level of security. Thus, in order to access the data on storage device 151, storage device 151 must be an original, secure storage device and must be inserted by the original user into storage device 151 that was originally used to write the data. If portions of all of these inputs are used, then the data on storage device 151, therefore, cannot be accessed via any other drive, either on computer 100 or any other computer or via any other user.

Method 200 has been described including blocks 204 through 216. In one embodiment, the storage manager repeats blocks 204 through 216 when a status change is detected for storage device 151, such as when storage device 151 is removed from removable media drive 121 and a new storage device 151 is inserted. As described above, upon the completion of method 200, computer 100 operates in a full-access mode or a restricted-access mode as determined by whether the storage manager can successfully retrieve security information from storage device 151, removable media drive 121, and the user. The following sections describe the full-access and restricted-access operating modes.

Full-Access and Limited-Access Data Storage Modes of Operation

When computer 100 is operating in a full-access mode, all data read from storage device 151 is decrypted according to the key generated by the above process. Similarly, all data written to storage device 151 is encrypted using the key. This ensures that any data written to a removable storage device 151 is safely encrypted and cannot be duplicated.

In addition, in full-access mode, computer 100 allows the user to access local area network 51 and remote computer 49. In this manner, the present invention allows storage device 151 to be used as an "access card" by which the user gains access to sensitive data of the organization. In addition, data stored on other storage devices, such as internal hard disk 120, tape cartridges, read/write optical discs, etc., may actually be encrypted using the unique key generated from the unique format information of key disk 151. In this fashion, a user must have a secure storage device 151 in order to access the data stored on these devices. In this manner, an organization can require that all authorized users have a secure storage device 151 in order to access data stored within the organization and to store data on any removable media. This data, if copied to another removable media, would be unreadable according to the present invention.

For ultra-secure environments, a cryptographic key can be generated from a combination of the unique format information of a plurality of storage media. For example, in one embodiment, data stored on storage device 151 and hard disk 120 may be encrypted using a key derived from the unique format information of storage device 151 and from the unique format information of hard disk 120. A cryptographic key is generated by applying one or more cryptographic algorithms to the combination. Because the key is generated from unique information from both storage device 151 and hard disk 120, the user must have storage device 151 in order to access any data stored on hard disk 120.

In restricted-access mode, the storage manager configures removable-media drive 121 as a read-only drive such that the user can read data from the removable storage device but cannot write data to the drive. In addition, the user is prevented from accessing non-sensitive data within the organization. For high-security environments, the storage manager prevents both read and write access to storage device 151 when computer 100 is operating in restricted-access mode.

In one embodiment, computer 100 is configured to operate in restricted-access mode upon power-up until removable storage device 151 is verified as secure. Here, removable media drives 121 default to read-only operation until otherwise configured via the storage manager. As such, the present invention provides a secure computing environment even when the user tries to boot directly from one of the removable storage devices 151. During boot process, the storage manager attempts to verify that at least one of the storage devices 151 contain device-specific security information as described above. The storage manager operates computer 100 in restricted-access mode by default until the storage manager has successfully initialized and verified storage devices 151. Upon verification, the storage manager configures computer 100 to operate in a full-access data storage mode and instructs removable media drives 121 to allow write access to storage devices 151. On reset, power-up, or even upon removal of one of the storage devices 151, removable media drives 121 automatically return to the restricted-access mode. In addition, the storage manager can detect when the user seeks to install a new removable media drive to the system and may inhibit the drive from being accessed.

An Exemplary Secure Storage Device

Figure 3A:
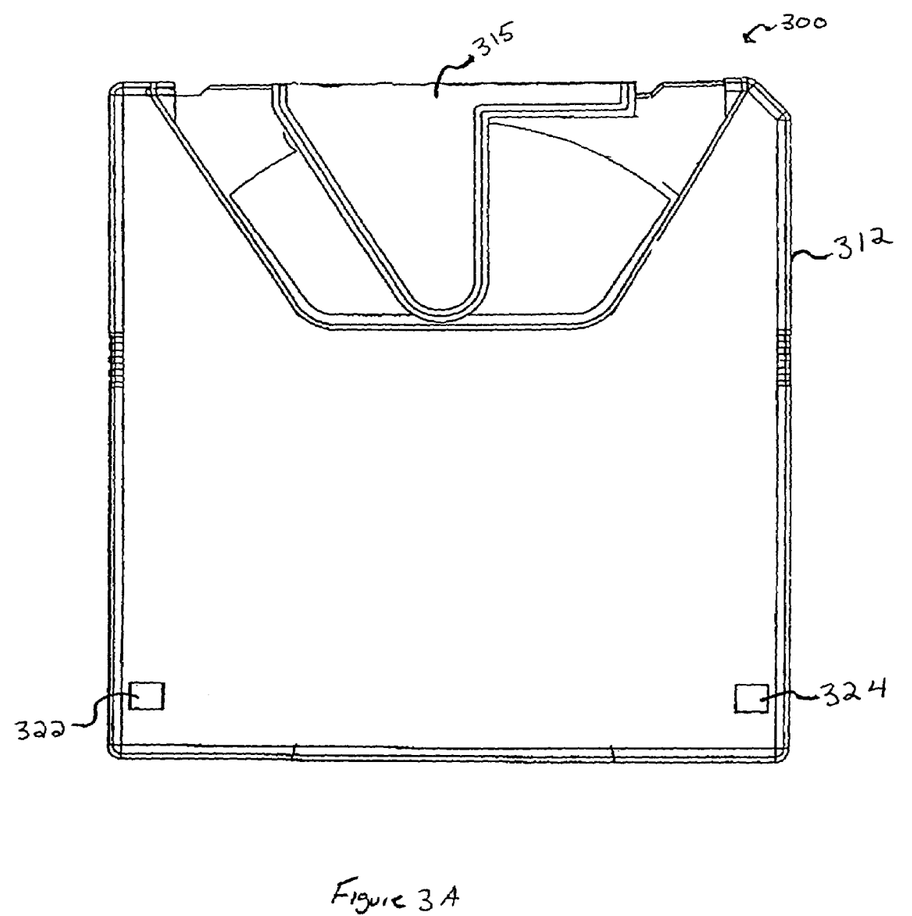
FIGS. 3A and 3B illustrate one embodiment in which the storage device of FIG. 1 is an LS-120 SuperDisk™ diskette from Imation Corporation.
Figure 3B:
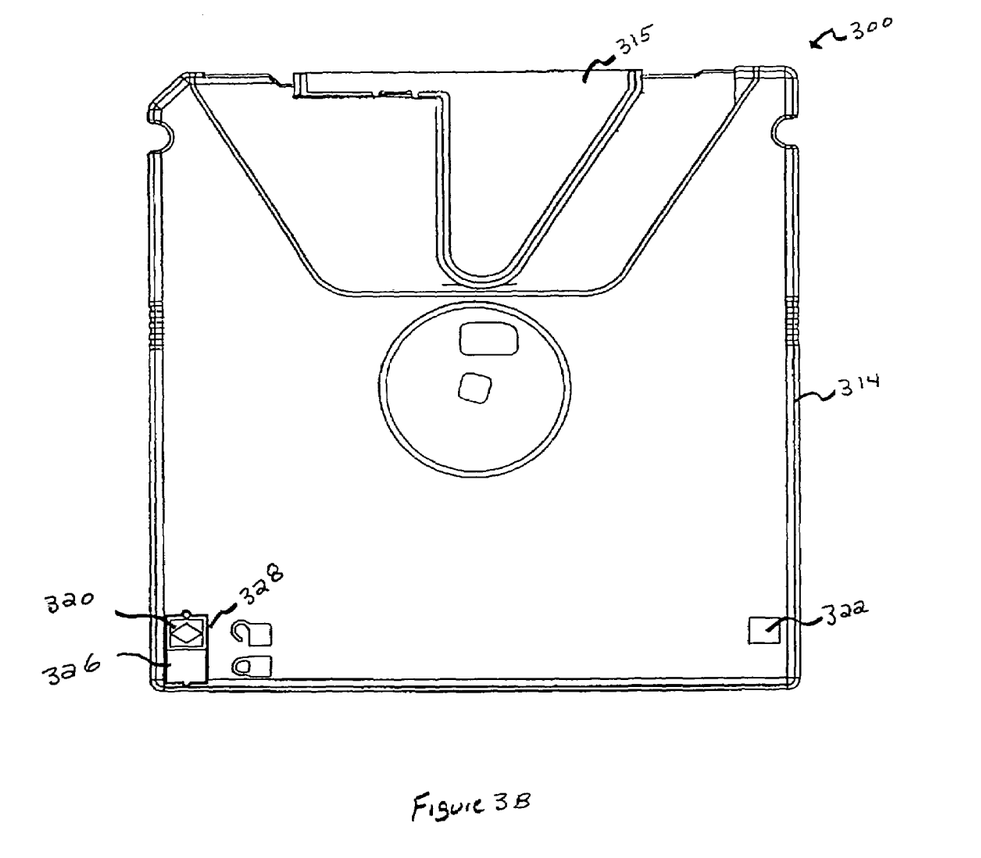

FIGS. 3A and 3B illustrate one embodiment of storage device 151 and how a unique, device-specific security information can be generated from the unique characteristics of the underlying storage medium. This embodiment is described for exemplary purposes only. The invention is not limited to this type of storage device but, as illustrated herein, may be applied to any storage device having unique format information.

In this exemplary embodiment, storage device 151 is an LS-120 SuperDisk™ 300 from Imation™ Corp. Top piece 312 of FIG. 3A and bottom piece 314 of FIG. 3B form a plastic shell around an internal magnetic media that consists of a polyester disk substrate with a metal particle coating on both sides. Shutter 315 protects a surface of the magnetic media. A spring keeps shutter 315 in a closed position outside of the plastic shell. Sensing hole 322 indicates that SuperDisk 300 is write-protected if placed in a standard drive 2 MB drive. Write protect tab 320 is movable between a write-protected position 326 and a write-enabled position 328 as illustrated in FIG. 3B. Sensing hole 324 is exposed when write protect tab 320 is in the write-protected position 326, thereby indicating that SuperDisk 300 is write protected when placed in a 120 MB drive.

Figure 4:
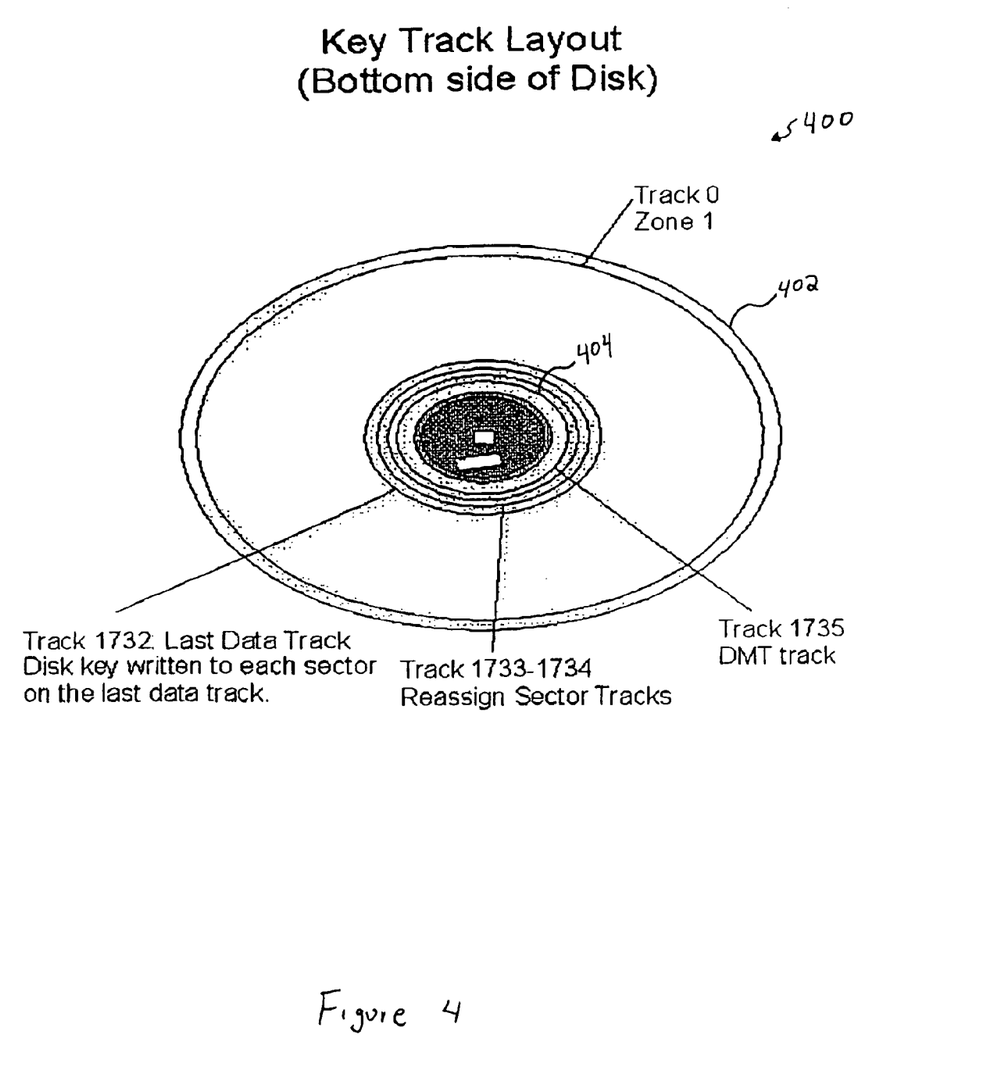
FIG. 4 illustrates a layout for storing data on a disc-shaped magnetic medium within the Imation SuperDisk.

FIG. 4 illustrates a layout for storing data on a magnetic media 400 within the exemplary SuperDisk diskette 300. As illustrated in FIG. 4, SuperDisk 300 includes a disc-shaped storage medium 400 that has 1736 data tracks per side for a total of 3472 tracks; track 0 starts at an outside diameter 402 while track 1735 conforms to an inside diameter 404. Tracks 0 through 1731 are typically used for holding user data. As explained in more detail below, track 1732 may be used to hold security information unique to SuperDisk 300 in accordance with the present invention. Tracks 1733–1734 are reserved for reassigned sectors. In other words, any sectors that are determined to be unreadable subsequent to the manufacturing are reassigned to locations within tracks 1733 and 1734. Track 1735 is designated as a disk maintenance track (DMT). In addition, each side of SuperDisk 300 has six overseek tracks at the outside diameter 402.

During manufacturing, SuperDisk 300 undergoes a two-step formatting process: low-level formatting and high-level formatting. In low-level formatting, format information is recorded on SuperDisk 300 and allows removable media drive 121 to locate data stored on SuperDisk 300. This format information includes a basic structure of the recorded data sectors including an identification field that provides each sector with a unique address and timing signals that allow removable media drive 121 to access the corresponding data sector. In addition, low-level formatting tests the integrity of each data sector such that the format information maps out bad or marginal sectors so they cannot subsequently be used by computer 100 for storing data.

SuperDisk 300 uses a slip-sector format that maps data into good data sectors. In the slip-sector format, each data sector is assigned a logical block address (LBA). The LBA identifies a readable sector of data and its logical position within SuperDisk 300. Furthermore, the slip-sector format defines 110 zones numbered from 0 to 109. Each zone has 32 tracks, except zones 108 and 109 that have 8 tracks per zone. The zones begin at outside diameter 402 of FIG. 3 and proceed to inside diameter 404. Each zone has an LBA that represents the starting address of the corresponding zone.

As bad sectors are encountered during low-level formatting, the sector is marked as bad and the LBA's for subsequent zones slip. Hard disk 120, however, maintains a list of bad sectors, referred to as a primary defect list.

In high-level formatting, additional information is recorded on SuperDisk 300 such as the operating system that the disk is intended to be used on. This information allows a specific computer and operating system to use SuperDisk 300 as a data storage medium. Any subsequent formatting by the user is typically only a high-level formatting process that simply rewrites a file allocation table (FAT) and directory structure of the disk.

From the exemplary embodiment described in FIGS. 3A, 3B and 4, a device-specific key can be generated using the unique format information described above. For example, the zone numbers and corresponding LBA's for SuperDisk 300, or a combination thereof, can be hashed to form the device-specific security information. This security information is written to a sector within SuperDisk 300 that would otherwise go unused for subsequent use for generation of a unique, device-specific key. Similarly, for hard disk 120, the sector addresses in a bad sector list can be used to generate input for the cryptographic algorithm.

Various embodiments of a secure computing environment have been presented in which a computer automatically operates in a secure full-access data storage mode when it detects the presence of a secure removable storage device. In order to create a highly secure computing environment, the invention combines information from a variety of sources to generate a cryptographic key for encrypting and decrypting the data stream between the computer and the removable storage device. For example, depending on the necessary level of security, the system uses format information that is unique to the removable storage device, manufacturing-specific information that is etched on the storage device, drive-specific information read from non-volatile memory of the removable media drive and user-specific information. When in a full-access mode, the user is able to access sensitive data within the organization and all data written to the storage device is encrypted. Otherwise the computer automatically operates in a restricted-access mode in which the user cannot access sensitive data within the organization and the removable storage device is operated in a read-only mode.

We claim:

1. A method comprising:
sensing whether a storage device has device-specific security information stored thereon;
operating a computer in a full-access mode when the storage device has the device-specific security information, wherein in the full-access mode the computer permits both read and write access to the storage device; and
operating the computer in a restricted-access mode when the storage device does not have the device-specific security information, wherein in the restricted-access mode the computer permits read access to the storage device and prevents write access to the storage device.

2. The method of claim 1, wherein operating the computer in a full-access mode includes automatically encrypting and decrypting a data stream between the computer and the storage device by:
encrypting digital data to be written to the storage device from the computer; and
decrypting digital data read from the storage device by the computer.

3. The method of claim 2, wherein the digital data is encrypted and decrypted using a cryptographic key generated from format information for the storage device.

4. The method of claim 2, wherein the digital data is encrypted and decrypted using a cryptographic key generated from information etched on the storage device during manufacturing.

5. The method of clam 2, wherein the digital data is encrypted and decrypted using a cryptographic key generated from information specific to a removable media drive used for accessing the storage device.

6. The method of claim 5, wherein the drive-specific information includes a drive serial number.

7. The method of claim 5, wherein the drive-specific information includes calibration parameters for the drive.

8. The method of claim 2, wherein the digital data is encrypted and decrypted using a cryptographic key generated from security information written to the storage device during low-level formatting.

9. The method of claim 2, wherein the digital data is encrypted and decrypted using a cryptographic key generated from a unique identifier stored within an electronic circuit embedded within the storage device.

10. The method of claim 1, wherein operating the computer in the full-access mode includes permitting a user to access sensitive data stored on a remote computer.

11. The method of claim 1, wherein operating the computer in the full-access mode includes permitting the user to access a second storage device.

12. The method of claim 11, wherein operating the computer in the full-access mode includes decrypting digital data read from a second storage device using a cryptographic key generated from the device-specific security information.

13. The method of claim 1, wherein sensing the storage device is performed when a status change is detected for the storage device.

14. The method of claim 13, wherein the status change indicates the insertion of the storage device into the computer.

15. A method for accessing a storage device comprising:
detecting a storage device within the storage drive;
sensing whether a storage device has device-specific security information stored thereon;
providing full-access to the storage device when the storage device has the device-specific security information by:
encrypting digital data using the security information during a write access to write the digital data to the storage device; and
decrypting digital data using the security information during a read access to read the digital data from the storage device; and
providing restricted-access to the storage device when the storage device does not store the device-specific security information by preventing the digital data from being written to the storage device during the write access.

16. The method of claim 15, wherein encrypting the digital data includes generating a cryptographic key as a function of format characteristics of an underlying storage medium of the storage device.

17. The method of claim 15, wherein encrypting the digital data includes generating a cryptographic key as a function of a unique identifier stored within an electronic circuit embedded within the storage device.

18. A method for controlling access to a storage device comprising:
detecting a storage device within a storage drive;
sensing whether the storage device has security information generated from a combination of device-specific information associated with the storage device and user-specific information associated with a user;
configuring the storage drive to prevent write access to the storage device when the security information is not sensed; and
configuring the storage drive to permit write access by encrypting digital data using the security information and writing the encrypted digital data to the storage device when the security information is sensed.

19. The method of claim 18, wherein encrypting digital data using the security information comprises generating a cryptographic key as a function of low-level format information for the storage device.

20. The method of claim 19, wherein the format information includes a primary defect list.

21. The method of claim 19, wherein the format information includes one or more logical block addresses.

22. The method of claim 19, wherein generating the key includes computing an arithmetic sum of the format information.

23. The method of claim 19, wherein generating the key includes evaluating a polynomial using the format information as data for the polynomial.

24. The method of claim 18, wherein encrypting digital data using the security information includes generating the cryptographic key as a function of the user-specific information.

25. The method of claim 18, wherein the user-specific information is a password.

26. The method of claim 18, wherein the user-specific information is biometric information.

27. The method of claim 26, wherein the biometric information is digital output from a retina scanner or a fingerprint scan.

28. The method of claim 18, wherein writing the encrypted digital data includes writing the encrypted digital data to a removable storage medium.

29. The method of claim 28, wherein writing the encrypted digital data includes writing the encrypted digital data to a data storage diskette.

30. A method for operating a storage drive comprising:
configuring the storage drive to operate in a read-only mode upon power-up;
determining whether a storage device has device-specific security information written thereon; and
configuring the storage drive to operate in a read/write mode when the storage device within the storage drive has device-specific security information written thereon.

31. The method of claim 30 and further including configuring the storage drive to operate in the read-only mode when the storage device within the storage drive does not have device-specific security information written thereon.

32. The method of claim 30 and further including configuring the storage drive to prevent all read and write access to the storage device when the storage device within the storage drive does not have device-specific security information written thereon.

33. A computer-readable medium having computer-executable instructions for performing the method of:
sensing whether a storage device is security information stored thereon;
operating a computer in a full-access mode when the storage device has the device-specific security information, wherein in the full-access mode the computer permits both read and write access to the storage device; and
operating the computer in a restricted-access mode when the storage device does not have the device-specific security information, wherein in the restricted-access mode the computer permits read access to the storage device and prevents write access to the storage device.

34. The computer-readable medium of claim 33, wherein operating the computer in a full-access mode includes the following:
encrypting digital data to be written to the storage drive; and
decrypting digital data read from the storage device.

35. The computer-readable medium of claim 34, wherein the digital data is encrypted and decrypted using a cryptographic key generated from format information for the storage device.

36. The computer-readable medium of claim 34, wherein the digital data is encrypted and decrypted using a cryptographic key generated from information etched into the storage device during manufacturing.

37. The computer-readable medium of claim 34, wherein the digital data is encrypted and decrypted using a cryptographic key generated from information specific to a removable media drive used for accessing the storage device.

38. The computer-readable medium of claim 34, wherein the digital data is encrypted and decrypted using a cryptographic key generated from information specific to a user.

39. A computer comprising:
a drive for accessing a data storage device having device-specific security information stored thereon; and
a storage manager to selectively configure the drive to operate in a full-access mode of operation or a restricted-access mode of operation as a function of the device-specific security information stored on the storage device, wherein in the full-access mode the drive permits both read and write access to the storage device, and in the restricted-access mode the drive permits read access to the storage device and prevents write access to the storage device.

40. The computer of claim 39, wherein the storage manager generates a cryptographic key as a function of the security information and when operating in full-access mode automatically encrypts and decrypts a data stream associated with the read and write access to the storage device using the generated key.

41. The computer of claim 39, wherein the drive includes drive-specific information stored in a non-volatile memory, and further wherein the storage manager generates a cryptographic key as a function of the drive-specific information and decrypts data stored on the storage device using the generated key.

42. The computer of clam 39, wherein the storage device includes a serial number physically etched onto the storage device during manufacturing, and further wherein the storage manager generates a cryptographic key as a function of the serial number and decrypts data stored on the storage dice using the generated key.

43. The computer of claim 39, wherein the storage manager generates a cryptographic key as a function of the format information and user-specific information and decrypts data on the storage device using the generated key.

44. The computer of claim 39, wherein the format information of the storage device includes a primary defect list.

45. The computer of claim 39, wherein the format information of the storage device includes one or more logical block addresses.

46. The computer of claim 39, wherein the storage device is a removable storage medium.

47. The computer of claim 39, wherein the storage device is a data storage diskette.

48. The computer of claim 39, wherein the storage device has a disk-shaped storage medium.

49. A computer comprising:
a storage drive operating in a read-only mode upon power-up;
a storage device operably coupled to the storage drive, wherein the storage device has device-specific format information stored thereon; and
a storage manager to selectively configure the storage drive to operate in a read/write mode as a function of the format at information stored on the storage device.

50. The computer of claim 49, wherein the software application generates a cryptographic key as a function of the format information, verifies the security information on the storage device using the generated key and, upon verification, configures the storage drive to operate in read/write mode.

* * * * *